(12) United States Patent
Matsuhashi et al.

(10) Patent No.: US 12,741,344 B2
(45) Date of Patent: Sep. 22, 2026

(54) WELD STRUCTURE, STAINLESS STEEL WELDED STRUCTURE, STAINLESS STEEL WELDED CONTAINER AND STAINLESS STEEL

(71) Applicant: NIPPON STEEL Stainless Steel Corporation, Tokyo (JP)

(72) Inventors: Tooru Matsuhashi, Tokyo (JP); Naohito Kumano, Tokyo (JP)

(73) Assignee: NIPPON STEEL STAINLESS STEEL CORPORATION, Tokyo (JP)

( * ) Notice: Subject to any disclaimer, the term of this patent is extended or adjusted under 35 U.S.C. 154(b) by 903 days.

(21) Appl. No.: 17/907,885

(22) PCT Filed: Mar. 19, 2021

(86) PCT No.: PCT/JP2021/011555
§ 371 (c)(1),
(2) Date: Aug. 29, 2022

(87) PCT Pub. No.: WO2021/193479
PCT Pub. Date: Sep. 30, 2021

(65) Prior Publication Data

US 2023/0126782 A1 Apr. 27, 2023

(30) Foreign Application Priority Data

Mar. 25, 2020 (JP) ................................ 2020-053732

(51) Int. Cl.
*B23K 35/30* (2006.01)
*C22C 38/00* (2006.01)
(Continued)

(52) U.S. Cl.
CPC ........ *B23K 35/3086* (2013.01); *C22C 38/001* (2013.01); *C22C 38/002* (2013.01);
(Continued)

(58) Field of Classification Search
CPC ........... B23K 2103/05; B23K 35/3053; B23K 35/308; B23K 35/3086; B23K 9/167;
(Continued)

(56) References Cited

U.S. PATENT DOCUMENTS 4,325,994 A 4/1982 Kitashima et al.
2010/0062279 A1 3/2010 Osuki et al.
(Continued)

FOREIGN PATENT DOCUMENTS

CN 101583733 A 11/2009
CN 101652491 A 2/2010
(Continued)

OTHER PUBLICATIONS

NPL: on-line translation of JP 2018028146 A, Feb. 2018 (Year: 2018).*

(Continued)

*Primary Examiner* — Jie Yang
(74) *Attorney, Agent, or Firm* — Birch, Stewart, Kolasch & Birch, LLP

(57) ABSTRACT

A weld structure includes a first stainless steel member and a second stainless steel member. A crevice made by welding is defined by welding an end of the first stainless steel member and a portion other than an end of the second stainless steel member. A portion close to the end of the first stainless steel member is formed as a weld metal portion by performing welding heat input on the portion close to the end of the first stainless steel member. In the crevice made by welding, a length $L_B$ from a boundary between the weld metal portion and a raw material portion to a crevice deepest portion and a crevice length $L_C$ from the crevice deepest portion to a 40 μm-width position satisfy $L_C<L_B$.

20 Claims, 2 Drawing Sheets

(51) Int. Cl.

| | |
|---|---|
| ***C22C 38/02*** | (2006.01) |
| ***C22C 38/04*** | (2006.01) |
| ***C22C 38/06*** | (2006.01) |
| ***C22C 38/34*** | (2006.01) |
| ***C22C 38/42*** | (2006.01) |
| ***C22C 38/44*** | (2006.01) |
| ***C22C 38/46*** | (2006.01) |
| ***C22C 38/48*** | (2006.01) |
| ***C22C 38/50*** | (2006.01) |
| ***C22C 38/52*** | (2006.01) |
| ***C22C 38/54*** | (2006.01) |
| ***C22C 38/58*** | (2006.01) |
| *B23K 103/04* | (2006.01) |

(52) U.S. Cl.

CPC .......... *C22C 38/004* (2013.01); *C22C 38/005* (2013.01); *C22C 38/008* (2013.01); *C22C 38/02* (2013.01); *C22C 38/04* (2013.01); *C22C 38/06* (2013.01); *C22C 38/34* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *B23K 2103/05* (2018.08); *C22C 2202/02* (2013.01)

(58) Field of Classification Search

CPC ........... B23K 9/23; C22C 38/02; C22C 38/04; C22C 38/58; C22C 38/004; C22C 38/06

See application file for complete search history.

(56) References Cited

U.S. PATENT DOCUMENTS

| | | | | |
|---|---|---|---|---|
| 2010/0084413 A1* | 4/2010 | Adachi | .................. | C22C 38/26 220/660 |
| 2014/0023432 A1 | 1/2014 | Matsuhashi et al. | | |
| 2019/0105727 A1 | 4/2019 | Sagara et al. | | |
| 2020/0308677 A1 | 10/2020 | Kawabe et al. | | |

FOREIGN PATENT DOCUMENTS

| | | | |
|---|---|---|---|
| CN | 103459641 | A | 12/2013 |
| CN | 109070281 | A | 12/2018 |
| CN | 109415784 | A | 3/2019 |
| JP | 56-99098 | A | 8/1981 |
| JP | 6-11193 | A | 1/1994 |
| JP | 2007-146202 | A | 6/2007 |
| JP | 2009-185382 | A | 8/2009 |
| JP | 2010-65279 | A | 3/2010 |
| JP | 2010-202916 | A | 9/2010 |
| JP | 2011-184732 | A | 9/2011 |
| JP | 2013-204128 | A | 10/2013 |
| JP | 2014-125275 | A | 7/2014 |
| JP | 2015-51448 | A | 3/2015 |
| JP | 2016-168616 | A | 9/2016 |
| JP | 2016-191094 | A | 11/2016 |
| JP | 2018-28146 | A | 2/2018 |
| JP | 2019-157219 | A | 9/2019 |
| KR | 10-2013-0123463 | A | 11/2013 |
| TW | 201247899 | A1 | 12/2012 |
| WO | WO 2012/133681 | A1 | 10/2012 |

OTHER PUBLICATIONS

Indian Office Action dated Dec. 7, 2023 for corresponding Application No. 202217050811 with an English translation.

International Search Report for PCT/JP2021/011555 mailed on May 25, 2021.

Office Action for Taiwanese patent application No. 110110699 issued on Dec. 20, 2021.

Korean Office Action for corresponding South Korean Application No. 10-2022-7032117, dated Aug. 15, 2024, with an English translation.

Chinese Notice of Allowance and Search Report for corresponding Chinese Application No. 202180023715.7, dated Sep. 1, 2023, with English translation.

Japanese Notice of Allowance for corresponding Japanese Application No. 2022-510454, dated Aug. 8, 2023, with partial English translation.

English translation of International Preliminary Report on Patentability (PCT/IB/373) with Written Opinion of the International Searching Authority (PCT/ISA/237) for International Application No. PCT/JP2021/011555 issued on Sep. 22, 2022.

Chinese Office Action and Search Report for corresponding Chinese Application No. 202180023715.7, dated Apr. 7, 2023, with English translation.

Extended European Search Report for corresponding European Application No. 21774920.9, dated Mar. 5, 2024.

* cited by examiner

WELD STRUCTURE, STAINLESS STEEL WELDED STRUCTURE, STAINLESS STEEL WELDED CONTAINER AND STAINLESS STEEL

TECHNICAL FIELD

The present invention relates to a weld structure having a crevice made by welding, a stainless steel welded structure, a stainless steel welded container, and a stainless steel.

BACKGROUND ART

With excellent properties such as high corrosion resistance and high strength, stainless steel is widely used for a structure storing clean water, warm water, or the like.

Ferritic stainless steel is widely used for such a stainless steel structure. Taking advantages of the excellent resistance to stress corrosion cracking (SCC resistance), ferritic stainless steel is particularly used for a hot-water tank such as an electric water heater and a heat pump-type water heater. With recent demand for the increase in hot water supply pressure to provide a comfortable bathing environment, steel is required to be stronger than SUS444 and SUS445J1, which are representative examples of ferritic stainless steel conventionally used as a material of a can body for storing hot water.

Patent Literature 1 discloses, as an exemplary high-strength material, a ferritic stainless steel with enhanced strength by addition of Cr, Si, and Ni.

However, in order to increase the strength of ferritic stainless steel, Si and Ni each need to be added at approximately 2% when Cr is 24%, as in Examples of Patent Literature 1. This may affect the cost of raw materials and decrease the toughness of ferritic stainless steel to cause a problem in manufacture of a steel sheet or a welded structure such as a can body. The decrease in toughness is a problem peculiar to ferritic stainless steel.

Further, a welded structure has a problem of crevice corrosion peculiar to stainless steel. The crevice corrosion is known to be caused more easily as the crevice is narrower. Further, when a temper colored scale due to welding is caused in a material for the welded structure, crevice corrosion is more likely to be induced depending on the scale composition.

Patent Literature 1 refers to the above problems. In a crevice structure of Patent Literature 1, the crevice depth is 7 mm and the maximum crevice width is 20 μm or less. Further, Patent Literature 1 describes that in terms of the temper colored scale, an average Cr ratio in oxide scales in a crevice made by welding within 1 mm from a weld-bonding end without any Argon back gas sealing is defined at 20 mass % or more relative to all metal elements.

Here, Patent Literature 1 assumes that the crevice structure therein is very narrow and extremely likely to cause crevice corrosion, and that Argon back gas shield is not performed, decreasing the corrosion resistance of a base material. On that premise, a surface oxide film in a case where the temper colored scale is formed in the crevice of the weld-bonding portion is defined.

Patent Literature 2 describes that a crevice structure has a crevice depth of 4 mm and a maximum crevice width of 30 μm or less, and in order to address the temper colored scale, an average Cr ratio of oxide scales in a crevice within 2 mm from a bonding end without any back shield is increased.

Also in Patent Literature 2, the crevice structure is narrow and the weld-bonding portion and the temper colored scale are included in the crevice.

Patent Literature 3 describes a method of improving a welded portion of austenite stainless steel and ferritic stainless steel. Patent Literature 3 relates to a welded portion using different materials, where austenite stainless steel is used for a filler (core wire) when ferritic stainless steel is used for a shell plate and an end plate, or ferritic stainless steel is used for a filler (core wire) when austenite stainless steel is used for a shell plate and an end plate. Patent Literature 3, however, only defines a micro structure of a weld metal portion, and fails to describe a composition of the weld metal portion and duplex stainless steel.

Patent Literature 4 describes a ferritic stainless steel excellent in the corrosion resistance of a welded portion with austenite stainless steel. Similar to Patent Literature 3, Patent Literature 4 relates to a welded portion using different materials, where austenite stainless steel is used for a filler (core wire) when ferritic stainless steel is used for a shell plate and an end plate, or ferritic stainless steel is used for a filler (core wire) when austenite stainless steel is used for a shell plate and an end plate. Patent Literature 4, however, only defines a composition of ferritic stainless steel, and fails to describe a crevice made by welding and duplex stainless steel.

CITATION LIST

Patent Literature(s)

Patent Literature 1: JP 2011-184732 A
Patent Literature 2: JP 2009-185382 A
Patent Literature 3: JP 6-11193 A
Patent Literature 4: JP 2010-202916 A

SUMMARY OF THE INVENTION

Problem(s) to be Solved by the Invention

The invention relates to a stainless steel TIG welded structure excellent in the corrosion resistance of a TIG welded portion, as a structure storing clean water, warm water, or the like. An object of the invention is to provide a weld structure capable of inhibiting crevice corrosion of a crevice made by welding, a stainless steel welded structure and a stainless steel welded container using the same, and a stainless steel used for the above. Further, a stainless steel TIG welded structure with high strength is preferable.

Means for Solving the Problems

In a weld structure formed by welding members, a boundary between a weld metal portion 6 and a steel portion (raw material portion) is referred to as a bonding portion 9, and a Heat Affected Zone (thermally affected portion) of the steel portion (raw material portion) may be referred to as a HAZ portion 8 (see FIG. 1).

The inventors have dedicatedly studied the improvement in corrosion resistance of a stainless steel welded structure and a stainless steel welded container including a weld structure with a crevice made by welding, as well as a high-strength stainless steel therefor. As a result, the inventors have arrived at the findings for optimizing a weld metal portion of a weld structure and a structure of a crevice made by welding in order to improve the corrosion resistance in a crevice formed by welding (i.e., to improve the crevice corrosion resistance).

Specifically, crevice corrosion is avoided by positioning the Heat Affected Zone (thermally affected portion) caused by the welding of stainless steel in an area not affected by the crevice corrosion.

In typical stainless steel, corrosion resistance is likely to decrease in the Heat Affected Zone affected by welding. Especially, in a weld structure using duplex stainless steel or austenite stainless steel, sensitization may occur under certain weld conditions and/or steel constituents. Normally, the decrease in corrosion resistance is not likely to occur in high-purity ferritic stainless steel to which stabilizing elements for inhibiting sensitization such as Ti and Nb are added. However, the corrosion resistance may decrease when no shielding gas is used in welding. In order to address the above problems, the composition of a variety of stainless steel has been modified, achieving some improvement through the modified composition. In actual welding, however, the HAZ portion may have difficulty in keeping the corrosion resistance stably due to heat input or variation in welding execution.

The inventors thus tried to improve the corrosion resistance by modifying a structure of a crevice made by welding in addition to steel constituents. As a result, the inventors have reached the following findings: in a welded portion, corrosion occurs in a HAZ portion within 2 mm from a boundary of a bonding portion toward a raw material portion, unlike the crevice corrosion, corrosion in the HAZ portion is not self-catalytically progressed by positioning the HAZ portion outside the crevice, thereby extremely reducing the possibility that pitting corrosion passes through the welded portion to cause water leakage, and crevice corrosion in a welded portion occurs in a portion closer to an innermost part of the crevice than a portion apart for a distance 40 μm from the crevice deepest portion (hereinafter also referred to as "40 μm-width position"), and no crevice corrosion occurs in an outside area farther away from the 40 μm-width position.

In a weld structure as shown in FIG. 1, a crevice made by welding 3 is a crevice formed by two members (an end plate 13 and a shell plate 14 in the example of FIG. 1). A deepest portion of the crevice where the two members are in contact with each other is referred to as a crevice deepest portion 4. The crevice width is larger, as a distance from the crevice deepest portion 4 is longer. The position at a crevice width of 40 μm is referred to as a 40 μm-width position 5. As described above, crevice corrosion has been found to be inhibited by positioning the boundary (bonding portion 9) between the weld metal portion 6 and the raw material portion outside the 40 μm-width position 5 (at an opposite side of the crevice deepest portion 4), in other words, by making the crevice width of the HAZ portion 8 larger than 40 μm.

In the example of FIG. 1, the effects of the invention can be achieved by adjusting a positional relationship between the bonding portion 9 and the 40 μm-width position 5 in the shell plate 14 that is a member forming the crevice made by welding 3, as described above. The details will be described later.

The weld structure having the crevice made by welding according to the invention is beneficial for a welded structure or the like having a structure of a crevice made by welding and required to have excellent corrosion resistance. The structure of the welded structure is not particularly limited, but especially beneficial for a container such as a can body for storing warm water.

Further, the inventors have found out that using a low-carbon austenitic stainless steel as filler metal further improves the corrosion resistance of the weld metal portion. Since low-carbon austenitic stainless steel contains a high proportion of Cr and Ni that improve corrosion resistance, the corrosion resistance of the weld metal portion is further enhanced.

On the other hand, a high-strength material is requested in order to meet a demand for a container having the ability to withstand higher pressure, such as a water heater. Duplex stainless steel has a dual phase structure of a ferrite phase and an austenite phase. At the same thickness, duplex stainless steel has higher strength than typical ferritic stainless steel and austenitic stainless steel, because duplex stainless steel has finer crystal grains owing to metallurgical characteristics. This makes it possible to provide a high-strength material without using a high proportion of expensive elements, unlike conventionally used ferritic stainless steel. The inventors have dedicatedly studied constituents of the duplex stainless steel having a high strength and capable of inhibiting the decrease in corrosion resistance in the HAZ portion, and have found out an optimal constituent range.

Further, duplex stainless steel is also excellent in SCC resistance. The immunity to SCC of duplex stainless steel, although not higher than that of ferritic stainless steel, is known to be superior to general-purpose austenitic stainless steel such as SUS304. The duplex stainless steel is thus applicable to such a can body for storing hot water as having caused water leakage due to SCC when being formed using SUS304.

The invention has been made in view of the above, and the gist of the invention is as follows.

[1] A weld structure including: a first stainless steel member and a second stainless steel member, the first stainless steel member and the second stainless steel member defining a crevice made by welding an end of the first stainless steel member and a portion other than an end of the second stainless steel member, in which a portion close to the end of the first stainless steel member is formed as a weld metal portion by performing welding heat input on the portion close to the end of the first stainless steel member, and a length $L_B$ from a boundary between the weld metal portion and a raw material portion to a crevice deepest portion and a crevice length $L_C$ from the crevice deepest portion to a position having a crevice width of 40 μm satisfy $L_C<L_B$.

[2] The weld structure according to [1], in which the weld structure is formed using a low-carbon austenitic stainless steel or a duplex stainless steel as a welding material for welding.

[3] The weld structure according to [1] or [2], in which one or both of the first stainless steel member and the second stainless steel member contains: by mass %, 0.001 to 0.050% of C; 0.035% or less of P; 0.01% or less of S; 0.01 to 1.50% of Si; 0.1% or more and less than 8.0% of Mn; 20.0 to 26.0% of Cr; 0.5 to 7.0% of Ni; 0.1 to 4.0% of Mo; 0.10 to 0.25% of N; 0.01 to 0.30% of V; 0.001 to 0.300% of Nb; 0.01 to 1.00% of W; 0.01 to 2.00% of Cu; 0.001 to 0.100% of Al; and a balance consisting of Fe and impurities, and one or both of the first stainless steel member and the second stainless steel member satisfies Formula (1) below and has a tensile strength of 700 MPa or more, $$V+8W+5Nb+N+5C \geq 0.50 \quad (1)$$

where V, W, Nb, N, and C mean contents (mass %) of the respective elements.

[4] The weld structure according to [3], in which, in place of a part of the Fe, one or two or more of: 0.005 to 0.300% of Ti; 0.01 to 1.00% of Co; 0.005 to 0.200% of Ta; 0.001 to 0.050% of Zr; 0.001 to 0.080% of Hf; 0.001 to 0.100% of Sn; 0.001 to 0.100% of Sb; 0.0001 to 0.0050% of B; 0.0005 to 0.0050% of Ca; 0.0001 to 0.0030% of Mg; and 0.005 to 0.100% of REM is/are contained.

[5] A stainless steel welded structure including the weld structure according to any one of [1] to [4].

[6] A stainless steel welded container including the weld structure according to any one of [1] to [4], in which the first stainless steel member is a cylindrical shell plate, and the second stainless steel member is an end plate formed by press forming.

[7] A stainless steel used in one or both of the first stainless steel member and the second stainless steel member in any one of the weld structure according to any one of [1] to [4], the stainless steel welded structure according to [5], and the stainless steel welded container according to [6], the stainless steel containing:

by mass %, 0.001 to 0.050% of C; 0.035% or less of P; 0.01% or less of S; 0.01 to 1.50% of Si; 0.1% or more and less than 8.0% of Mn; 20.0 to 26.0% of Cr; 0.5 to 7.0% of Ni; 0.1 to 4.0% of Mo; 0.10 to 0.25% of N; 0.01 to 0.30% of V; 0.001 to 0.300% of Nb; 0.01 to 1.00% of W; 0.01 to 2.00% of Cu; 0.001 to 0.100% of Al; and a balance consisting of Fe and impurities, the stainless steel satisfying Formula (1) below and having a tensile strength of 700 MPa or more, $$V+8W+5Nb+N+5C \geq 0.50 \quad (1)$$

where V, W, Nb, N, and C mean contents (mass %) of the respective elements.

[8] The stainless steel according to [7], further containing, in place of a part of the Fe, one or two or more of: 0.005 to 0.300% of Ti; 0.01 to 1.00% of Co; 0.005 to 0.200% of Ta; 0.001 to 0.050% of Zr; 0.001 to 0.080% of Hf; 0.001 to 0.100% of Sn; 0.001 to 0.100% of Sb; 0.0001 to 0.0050% of B; 0.0005 to 0.0050% of Ca; 0.0001 to 0.0030% of Mg; and 0.005 to 0.100% of REM.

The above aspects of the invention can provide a weld structure excellent in corrosion resistance of a crevice made by welding, a stainless steel welded structure, a stainless steel welded container, and a stainless steel.

BRIEF DESCRIPTION OF DRAWING(S)

DESCRIPTION OF EMBODIMENT(S)

The details of the invention are explained below.

The inventors have dedicatedly developed a high-pressure container that is excellent in corrosion resistance of a crevice made by welding and preferably has high strength, and a stainless steel therefor, arriving at the following findings.

Figure 1:
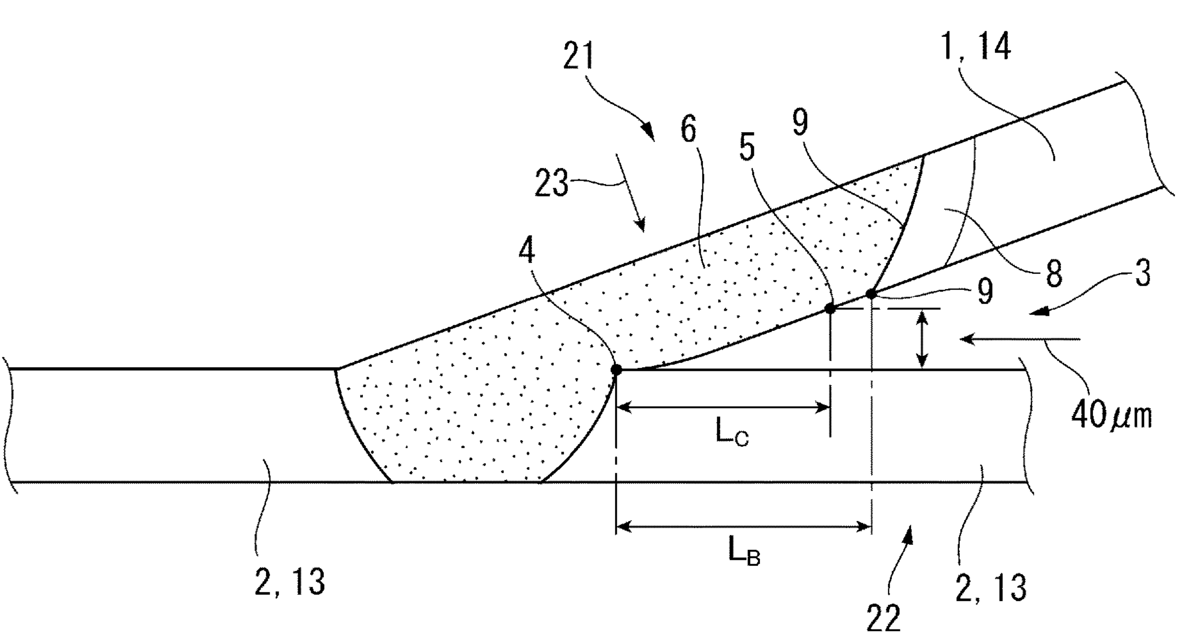
FIG. 1 is a cross-sectional view of a structure of a crevice made by welding.

1. The inventors have found out that a welded structure using stainless steel can have high resistance to crevice corrosion by optimizing weld metal and a crevice structure thereof. FIG. 1 shows a crevice made by welding 3 formed in a welded joint of an end plate 13 and a shell plate 14 of a welded container. An end of the shell plate 14 (in the following, also referred to as a first stainless steel member 1) and a portion other than an end of the end plate 13 (in the following, also referred to as a second stainless steel member 2) are welded. At a side close to the shell plate 14 with respect to the crevice made by welding 3, welding heat input 23 is applied to a portion close to the end of the shell plate 14 (first stainless steel member 1). Thus, in the weld structure of the crevice made by welding 3, the portion close to the end of the first stainless steel member 1 (shell plate 14) is formed as a weld metal portion 6. Specifically, as shown in FIG. 1 (a cross-sectional view of a structure of a crevice made by welding), a length from a boundary (bonding portion 9) between the weld metal portion 6 and a raw material portion to a crevice deepest portion 4 is defined as a length $L_B$, and a crevice length from the crevice deepest portion 4 to a 40 μm-width position 5 is defined as a length $L_C$. The inventors closely examined a relationship between crevice corrosion resistance and the relationship between $L_B$ and $L_C$.

Corrosion test conditions are as follows: $Cl^-$; 600 ppm, $Cu^{2+}$; 2 ppm, $Cu^{2+}$ test solution, at 80 degrees C., oxygen injection, and continuous dipping for two weeks. The test solution was changed after 1 week.

As a result, the inventors have found out that the crevice corrosion can be prevented by not positioning a HAZ portion 8 in a crevice (a position closer to the crevice deepest portion 4 than 40 μm-width position 5). This favorable result is obtained when a relationship between the length $L_B$ (length from the boundary (bonding portion 9) between the weld metal portion 6 and the raw material portion to the crevice deepest portion 4) and the crevice length $L_C$ (length from the crevice deepest portion 4 to the 40 μm-width position 5) satisfies $L_C < L_B$. It is known that the crevice corrosion may be caused at a crevice width of narrower than 40 μm. By virtue of the finding of the invention, it is revealed that no crevice corrosion is caused in the HAZ portion 8 at a crevice width of wider than 40 μm. Thus, if the decrease in corrosion resistance occurs in a HAZ portion of a welded portion of duplex stainless steel, and even if a pitting corrosion occurs in a surface layer of the HAZ portion, when $L_C < L_B$ is satisfied, the HAZ portion is in a position where crevice corrosion does not occur. This makes it possible to prevent at least self-catalytically progressed corrosion, and consequently prevent any damage from water leakage.

2. There may be an arrangement in which a HAZ portion of the end plate 13 (second stainless steel member 2) is provided close to the crevice deepest portion. Also in this arrangement, the effect of the invention can be achieved by adjusting the positional relationship between the bonding portion 9 and the 40 μm-width position 5 in a portion close to the end of the shell plate 14 (first stainless steel member 1) forming the crevice made by welding 3, as shown in FIG. 1. The HAZ portion, which is also included in the end plate 13 (second stainless steel member 2) forming the crevice made by welding 3, is positioned in the vicinity of the crevice deepest portion. In this arrangement, even when crevice corrosion occurs, the effect on the HAZ portion of the end plate 13 is typically small. This is because crevice corrosion mainly progresses in the vicinity of the 40 μm-width position 5.

3. A weld structure having the above crevice made by welding that is excellent in crevice corrosion resistance is applicable to ordinary stainless steel welded structures that need to have crevice corrosion resistance. Particularly, such a weld structure is suitable for a stainless steel welded container formed from a shell plate and an end plate, such as a can body for storing warm water. In a welded container in which the crevice made by welding 3 is formed in the welded joint (formed by the end plate 13 and the shell plate 14), such as a structure shown in FIG. 1, a side close to the shell plate 14 with respect to the crevice made by welding 3 is referred to as an outside 21 of the crevice, and a side close to the end plate 13 with respect to the crevice made by welding 3 is referred to as an inside 22 of the crevice.
4. Filler metal may be used in welding. In that case, the inventors have found out that using a low-carbon austenitic stainless steel or a duplex stainless steel as filler metal further improves the corrosion resistance of the weld metal portion 6. Since low-carbon austenitic stainless steel contains a high proportion of Ni that reduces the corrosion speed in welding, the corrosion resistance of the weld metal portion 6 is further enhanced. Specifically, in a schematic composition of Y309L, which is a low-carbon austenitic stainless steel typically used as filler metal, Cr: 24% and Ni: approximately 13% are satisfied. The corrosion resistance of the weld metal portion 6 can thus be relatively increased. Further, duplex stainless steel is suitably used as a welding material especially when duplex stainless steel is used for an end plate and a shell plate, in terms of the corrosion resistance and strength of the weld metal portion 6. Specifically, in a schematic composition of YS2209, which is a duplex stainless steel typically used as filler metal, Cr: approximately 22%, Ni: approximately 9%, Mo: approximately 3%, and N:0.1% are satisfied.
5. For the purpose of providing a welded structure and a welded container having the ability to withstand higher pressure, the inventors have found out that a material having a tensile strength of 700 MPa or more is desirable as a high-strength stainless steel, a duplex stainless steel is suitable as the material, and optimizing the constituents thereof may increase the strength. Specifically, V, W, Nb, N, and C are especially effective for the tensile strength, and the constituents are optimized, as follows:

$$V+8W+5Nb+N+5C\geq 0.50$$

where V, W, Nb, N, and C mean contents (mass %) of the respective elements.

Duplex stainless steel is considered to be suitable as a high-strength stainless steel for a high-pressure container according to the invention. Duplex stainless steel, however, is inferior in press formability. Thus, an end plate may not be formed properly through press forming depending on the shape thereof. In this case, the end plate is desired to have a shape suitable for duplex stainless steel, but a change in mold needs the time for trial production and the cost for mold change. In order to solve the above problems, the inventors reached the findings that the high-pressure container having the ability to withstand higher pressure is obtainable and the improvement of productivity of the container is achievable by using, as ever, general-purpose ferritic stainless steel or austenitic stainless steel for the end plate. This is because the end plate is typically in a bowl shape through press forming, allowing the end plate to resist high pressure. The performance demanded as the high-pressure container can thus be satisfied, even when general-purpose ferritic stainless steel or austenitic stainless steel is used in the end plate. Note that the ferritic stainless steel and austenitic stainless steel herein are assumed to have corrosion resistance according to contents of the high-pressure container. Specifically, SUS444, SUS445J1, SUS445J2, SUS315J1 and SUS315J2 are suitable for a container for storing clean water in warm temperature. When high strength is not needed, ferritic stainless steel and austenitic stainless steel are usable in both the first stainless steel member and the second stainless steel member.

Subsequently, a preferable composition of the first stainless steel member and the second stainless steel member in the weld structure of the invention, and a composition of the stainless steel of the invention are explained in detail.

The steel herein is preferably a stainless steel having a duplex structure. Since the duplex structure provides advantageous effects of fine crystal grains and a dual-phase structure to a material, a high-strength material is obtained. For the purpose of obtaining a material with higher strength, adding a proper content of V, W, Nb, N, and C results in a high-strength material of 700 MPa or more.

C is one of elements contributing to the increase in strength. However, an excessive addition of C reduces intergranular corrosion resistance and workability. Thus, the C content is more preferably in a range from 0.001% to 0.050%. Preferably, the lower limit is 0.005% and the upper limit is 0.040%. More preferably, the lower limit is 0.008% and the upper limit is 0.030%.

Similar to C, N greatly contributes to the increase in strength. However, similar to C, an excessive addition of N reduces intergranular corrosion resistance and workability. The N content is thus defined in a range from 0.10% to 0.25%. Preferably, the lower limit is 0.12% and the upper limit is 0.22%. More preferably, the lower limit is 0.15% and the upper limit is 0.20%.

Nb is known to inhibit the intergranular corrosion of a welded portion as a stabilizing element for carbon and nitrogen, and also known to increase the strength in raw material. However, an excessive addition of Nb may excessively increase the strength to reduce workability. Further, an excessive addition of Nb may increase costs. The Nb content is thus defined in a range from 0.001% to 0.300%. Preferably, the lower limit is 0.002% and the upper limit is 0.200%. More preferably, the lower limit is 0.003% and the upper limit is 0.100%.

Addition of V together with Nb not only contributes to the increase in strength but also improves corrosion resistance. However, an excessive addition of V reduces workability and saturates the effect of improving the corrosion resistance. The additive amount of V is thus defined in a range from 0.01% to 0.30%. Preferably, the lower limit is 0.05% and the upper limit is 0.25%. More preferably, the lower limit is 0.10% and the upper limit is 0.20%.

Any other elements are described below.

Si, which is an important element as a deoxidizing element, is effective for improving corrosion resistance and oxidation resistance. However, an excessive addition of Si reduces manufacturability. The Si content is thus defined in a range from 0.01% to 1.50%. Since Si is an essential element for deoxidation as described above, Si of 0.05% or more is preferably contained. Si preferably has a lower limit of 0.10% and an upper limit of 1.10%.

Mn is an important element for duplex stainless steel as an austenite stabilizing element. However, an excessive addition of Mn easily produces MnS that may generate a starting point of corrosion, deteriorating corrosion resistance. The Mn content is thus defined in a range of 0.1% or more and less than 8.0%. More preferably, the lower limit is 1.0% and the upper limit is 6.0%.

P not only reduces weldability and workability but also causes intergranular corrosion, and thus the P content needs to be low. For this reason, the P content is defined at 0.035% or less. More preferably, the lower limit is 0.001% and the upper limit is 0.02%.

S produces a water-soluble inclusion that may generate a starting point of corrosion, such as CaS and MnS. The S content thus needs to be low. For this reason, the S content is defined at 0.01% or less. However, an excessive low content of S increases costs. Thus, S more preferably has a lower limit of 0.0001% and an upper limit of 0.005%.

Cr is the most important element in exhibiting the corrosion resistance of stainless steel. Further, Cr has an effect of stabilizing the ferrite structure. However, an excessive addition of Cr not only reduces workability and manufacturability but also increases raw material costs. The Cr content is thus defined in a range from 20.0% to 26.0%. More preferably, the lower limit is 21.0% and the upper limit is 25.0%.

Mo has an effect of repairing a passivation film. Mo is a highly effective element for improving corrosion resistance. Further, addition of Mo together with Cr improves pitting resistance. However, an excessive addition of Mo significantly reduces workability and increases costs. The Mo content is thus defined in a range from 0.1% to 4.0%. Preferably, the lower limit is 0.2% and the upper limit is 3.0%.

In general, Cu has effects of not only lowering the active dissolution rate but also promoting repassivation. However, an excessive addition of Cu may promote corrosion. The Cu content is thus defined in a range from 0.01% to 2.00%. More preferably, the lower limit is 0.10% and the upper limit is 1.50%.

Ni has effects of not only stabilizing the austenite structure but also reducing the active dissolution rate. However, an excessive addition of Ni reduces workability and increases raw material costs. The Ni content is thus defined in a range from 0.5% to 7.0%. Ni preferably has a lower limit of 0.8% and an upper limit of 6.0%.

W has an effect of improving corrosion resistance. However, an excessive addition of W increases costs and reduces workability. The W content is thus defined in a range from 0.01% to 1.00%.

Al is important as a deoxidizing element and has an effect of controlling the composition of a nonmetallic inclusion to micronize the structure. However, an excessive addition of Al may coarsen the nonmetallic inclusion in metal refining, triggering flaws in the product. The Al content is thus defined in a range from 0.001% to 0.100%. More preferably, the lower limit is 0.007% and the upper limit is 0.080%.

In the stainless steel of the invention, a balance consists of Fe and impurities. In place of a part of Fe, the following selectable elements may be further contained. Ranges of the selectable elements are described below.

Ti, which fixes carbon and nitrogen, is a very important element for inhibiting intergranular corrosion in a welded portion to improve workability. However, similar to Al, Ti interferes with the uniformization of an oxide film in a welded portion, which may cause surface flaws at the time of manufacture. The Ti content is thus defined in a range from 0.005% to 0.300%. More preferably, the lower limit is 0.010% and the upper limit is 0.200%.

Co is an effective element for improving the toughness and corrosion resistance of steel. However, Co is expensive and an excessive addition of Co increases costs. The Co content is thus defined in a range from 0.01% to 1.00%. More preferably, the lower limit is 0.02% and the upper limit is 0.50%.

Sn and Sb have effects of not only improving crevice corrosion resistance but also reducing the dissolution rate when corrosion occurs. Thus, one or both of Sn and Sb may be added, as necessary. However, an excessive addition thereof not only decreases workability but also saturates the effect of improving corrosion resistance. The contents of Sn and Sb are each preferably in range from 0.001% to 0.100%. More preferably, the lower limit is 0.005% and the upper limit is 0.050%.

Similar to V, Zr not only improves crevice corrosion resistance but also has an effect as a stabilizing element for carbon and nitrogen. Zr may be added, as necessary. However, an excessive addition of Zr reduces workability and saturates the effect of improving the corrosion resistance. Thus, the Zr content is preferably in a range from 0.001% to 0.05%. More preferably, the lower limit is 0.005% and the upper limit is 0.03%.

Similar to Zr, Hf is a highly-effective nitride forming element, and has an effect of micronizing crystal grains. However, Hf is expensive and increases costs. The Hf content is thus defined in a range from 0.001% to 0.080%. Preferably, the lower limit is 0.003% and the upper limit is 0.010%.

B is a grain-boundary strengthening element that is effective for improving the resistance to secondary working brittleness. B is thus added, as necessary. However, an excessive addition of B leads to the solid-solution strengthening of ferrite to decrease ductility. The B content, when added, is defined in a range from 0.0001% to 0.0050%. More preferably, the lower limit is 0.0002% and the upper limit is 0.0020%.

Ta has an effect of improving corrosion resistance. However, an excessive addition of Ta increases costs and reduces workability. The Ta content is thus defined in a range from 0.005% to 0.200%.

Ca is an element effective for desulfurization in a steelmaking step. However, an excessive addition of Ca decreases corrosion resistance and manufacturability. The Ca content is thus defined in a range from 0.0005% to 0.0050%.

Mg micronizes the structure, and has an effect of improving workability and toughness. However, an excessive addition of Mg increases costs and decreases manufacturability. The Mg content is thus defined in a range from 0.0001% to 0.0030%.

REM is an element for improving the hot workability of steel. However, an excessive content of REM reduces hot workability and toughness. The REM content, when added, is defined in a range from 0.005% to 0.100%. The REM content is a sum of the contents of lanthanoid rare-earth elements such as La and Ce.

The technical features of the invention are the structure of the welded portion and the stainless steel used therein. Thus, a can body for storing hot water is taken as an example herein. The invention, however, is not limited thereto, and applicable to general stainless steel containers subjected to welding and including a shell plate and an end plate. A plate thickness t of a welding target material is not particularly limited, and can be appropriately determined in a range from 0.4 to 5 mm of a general-purpose thin plate material. The plate thickness is not limited to the above.

EXAMPLES

Example 1

In order to obtain the findings described above, a structure of weld metal and crevice corrosion resistance in a crevice made by welding were first evaluated.

As a test piece, three types of steel, as shown in Table 1, were each melted in a laboratory vacuum melting furnace, and a laboratory cold-rolled sheet with a thickness of 0.8 mm was produced by rolling and heat treatment.

TABLE 1

| No. | Steel Type | Type | Constituents (mass %) C | Cr | Ni | Mo | N | Nb | Cu | Others |
|---|---|---|---|---|---|---|---|---|---|---|
| 1-1 | SUS821J1 | Duplex | 0.016 | 22 | 2.2 | 0.2 | 0.19 | 0.0 | 0.8 | |
| 1-2 | ↓ | ↓ | ↓ | ↓ | ↓ | ↓ | ↓ | ↓ | ↓ | |
| 1-3 | ↓ | ↓ | ↓ | ↓ | ↓ | ↓ | ↓ | ↓ | ↓ | |
| 1-4 | ↓ | ↓ | ↓ | ↓ | ↓ | ↓ | ↓ | ↓ | ↓ | |
| 1-5 | ↓ | ↓ | ↓ | ↓ | ↓ | ↓ | ↓ | ↓ | ↓ | |
| 1-6 | ↓ | ↓ | ↓ | ↓ | ↓ | ↓ | ↓ | ↓ | ↓ | |
| 1-7 | ↓ | ↓ | ↓ | ↓ | ↓ | ↓ | ↓ | ↓ | ↓ | |
| 1-8 | ↓ | ↓ | ↓ | ↓ | ↓ | ↓ | ↓ | ↓ | ↓ | |
| 1-9 | ↓ | ↓ | ↓ | ↓ | ↓ | ↓ | ↓ | ↓ | ↓ | |
| 1-10 | ↓ | ↓ | ↓ | ↓ | ↓ | ↓ | ↓ | ↓ | ↓ | |
| 1-11 | ↓ | ↓ | ↓ | ↓ | ↓ | ↓ | ↓ | ↓ | ↓ | |
| 1-12 | ↓ | ↓ | ↓ | ↓ | ↓ | ↓ | ↓ | ↓ | ↓ | |
| 1-13 | ↓ | ↓ | ↓ | ↓ | ↓ | ↓ | ↓ | ↓ | ↓ | |
| 1-14 | ↓ | ↓ | ↓ | ↓ | ↓ | ↓ | ↓ | ↓ | ↓ | |
| 1-15 | ↓ | ↓ | ↓ | ↓ | ↓ | ↓ | ↓ | ↓ | ↓ | |
| 1-16 | SUS445J1 | α series | 0.003 | 22 | 0.0 | 1.2 | 0.01 | 0.3 | 0.0 | Ti: 0.13% |
| 1-17 | ↓ | ↓ | ↓ | ↓ | ↓ | ↓ | ↓ | ↓ | ↓ | ↓ |
| 1-18 | SUS315J2 | γ series | 0.040 | 18 | 12.1 | 0.8 | 0.12 | 0.0 | 1.9 | Si: 3.1% |
| 1-19 | ↓ | ↓ | ↓ | ↓ | ↓ | ↓ | ↓ | ↓ | ↓ | ↓ |

| No. | Welding Filler | $L_B$/mm | $L_C$/mm | $L_B - L_C$/mm | Corrosion Test Maximum Corrosion Depth/μm | Corrosion Resistance Evaluation | |
|---|---|---|---|---|---|---|---|
| 1-1 | — | 2.1 | 1.3 | 0.8 | 30 | A | Invention |
| 1-2 | — | 1.2 | 2.2 | −1.0 | 88 | X | Comparative |
| 1-3 | — | 1.4 | 0.8 | 0.6 | 16 | S | Invention |
| 1-4 | 309L | 2.2 | 1.2 | 1.0 | 21 | A | Invention |
| 1-5 | 309L | 1.8 | 1.5 | 0.3 | 30 | A | Invention |
| 1-6 | 309L | 3.0 | 2.2 | 0.8 | 34 | A | Invention |
| 1-7 | 309L | 1.5 | 0.8 | 0.7 | 25 | A | Invention |
| 1-8 | 309L | 1.2 | 3.0 | −1.8 | 91 | X | Comparative |
| 1-9 | 309L | 1.0 | 1.9 | −0.9 | 63 | X | Comparative |
| 1-10 | YS2209 | 2.2 | 1.1 | 1.1 | 20 | A | Invention |
| 1-11 | YS2209 | 1.9 | 1.5 | 0.4 | 28 | A | Invention |
| 1-12 | YS2209 | 3.0 | 2.1 | 0.9 | 31 | A | Invention |
| 1-13 | YS2209 | 1.5 | 0.8 | 0.7 | 21 | A | Invention |
| 1-14 | YS2209 | 1.2 | 3.1 | −1.9 | 82 | X | Comparative |
| 1-15 | YS2209 | 1.0 | 1.9 | −0.9 | 59 | X | Comparative |
| 1-16 | 309L | 2.2 | 1.2 | 1.0 | 29 | A | Invention |
| 1-17 | 309L | 1.2 | 3.0 | −1.8 | 101 | X | Comparative |
| 1-18 | 309L | 2.2 | 1.2 | 1.0 | 20 | A | Invention |
| 1-19 | 309L | 1.2 | 3.0 | −1.8 | 74 | X | Comparative |

α series: Ferrite,
γ series: Austenitic

Figure 2:
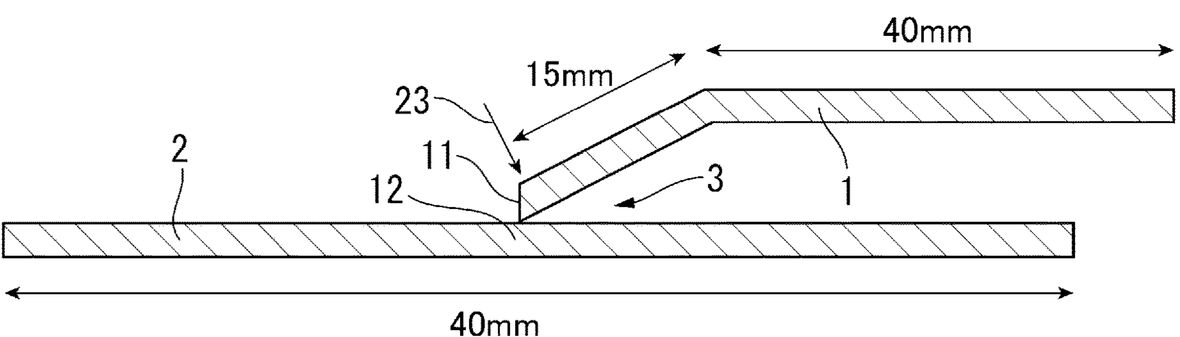
FIG. 2 is a cross-sectional view of an entirety of welding test pieces.

A welding test piece was then obtained by wet-polishing a surface of each test piece using 600-grit Emery paper, and cutting the test piece into a piece with 40 Wmm and 200 Lmm (second stainless steel member 2) and a piece with 55 Wmm and 200 Lmm (first stainless steel member 1). For providing an opening angle of the crevice, the piece with 55 Wmm (first stainless steel member 1) was bent at a position of 15 mm and combined with the flat plate with 40 Wmm (second stainless steel member 2), as shown in FIG. 2. Then, an end 11 of the bent workpiece (first stainless steel member 1) and a flat surface portion (portion 12 other than an end) of the plate workpiece (second stainless steel member 2) were joined by TIG welding. An angle adjustment in the bending process revealed that a crevice depth that satisfied a crevice width of 40 μm (length $L_C$ from the crevice deepest portion 4 to the 40 μm-width position 5, see FIG. 1) was approximately 0.8 to 3 mm. Commercially available 309L and YS2209 were used as filler metal.

As shown in FIG. 2, heat input (welding heat input 23) was performed on a portion close to the end 11 of the first stainless steel member 1. Welding rate was 50 cm/min using an Ar shield gas. The Ar shield gas was used at flow rates, as follows: at a side close to a torch being 15 L/min; gas after welding being fixed at 20 L/min; at a back surface of the torch being 5 L/min. A current value was varied in a range from 50 to 120 A to change the length of the weld metal portion 6, so that the position of the bonding portion 9 was adjusted (see FIG. 1). A cross-sectional shape of the crevice made by welding at this time is schematically shown in FIG. 1. As shown in FIG. 1, in a portion close to the end of the first stainless steel member 1, the length from the boundary (bonding portion 9) between the weld metal portion 6 and the raw material portion to the crevice deepest portion 4 is defined as a length $L_B$, the length from the crevice deepest portion to the 40 μm-width position 5 is defined as a length $L_C$, and values thereof were compared.

This workpiece was cut into a size of 20 mm in a longitudinal direction of welding, forming a test piece for corrosion resistance evaluation. A cut end surface thereof was wet-polished with 600-grit Emery paper. In order to expose only a crevice-surface side to the test environment, a torch-side weld metal portion, which corresponded to an outer surface side of a container, was coated with heat-resistance silicon resin. As a corrosion test solution, $CuCl_2$ reagent was used as an oxidizer in addition to NaCl. The test solution was adjusted so that $Cl^-$ was at 600 ppm and $Cu^{2+}$ was at 2 ppm$Cu^{2+}$. $Cu^{2+}$ was added to adjust oxidizing properties of the environment, and a concentration of 2 ppm was one of the concentrations simulating a general warm water environment. Dipping conditions were as follows: 80 degrees C., oxygen injection, and continuous dipping for two weeks. The test solution was changed after 1 week.

The depth of pitting corrosion and crevice corrosion after the test was measured by a focal depth method using an optical microscope. The measurement for pitting corrosion and crevice corrosion was performed after shaving the weld metal portion to open the crevice. The pitting corrosion and crevice corrosion were measured at a maximum of 10 points, and a maximum value thereof was defined as a maximum corrosion depth. A maximum corrosion depth of 50 μm or less was determined as Pass (A), and any other cases than the above were determined as Fail (X). A maximum corrosion depth of less than 20 μm was determined as particularly favorable (S).

The above test results are shown in Nos. 1-1 to 1-19 of Table 1.

Nos. 1-1 to 1-15 of Table 1 each show a result using a steel corresponding to SUS821J1. In Nos. 1-1 and 1-3 where no filler metal was used and the length $L_B$ from the boundary between the weld metal portion 6 and the raw material portion to the crevice deepest portion 4 was larger than the crevice length $L_C$ from the crevice deepest portion 4 to the 40 μm-width position 5 ($L_C<L_B$), the corrosion depth was approximately 30 μm that was smaller than a reference depth of 50 μm. The results of Nos. 1-1 and 1-3 were thus preferable. No. 1-2 not satisfying $L_C<L_B$ had a corrosion depth of 88 μm, exceeding the reference depth. The corrosion resistance thereof was thus inferior.

In Nos. 1-4 to 1-7 where 309L was used as filler metal and $L_C<L_B$ was satisfied, the corrosion depth was 50 μm or less in the corrosion test. Nos. 1-8 and 1-9 not satisfying $L_C<L_B$ had corrosion depth values exceeding the reference value.

In Nos. 1-10 to 1-13 where YS2209 was used as filler metal and $L_C<L_B$ was satisfied, the corrosion depth was 50 μm or less in the corrosion test. Nos. 1-14 and 1-15 not satisfying $L_C<L_B$ had corrosion depth values exceeding the reference value.

Nos. 1-16 to 1-19 of Table 1 show the results where a steel corresponding to SUS445J1 and a steel corresponding to SUS315J2 were used as steel types. Among Nos. 1-16 to 1-19 where the test pieces were prepared under the same conditions as No. 1-4 where filler metal was used and $L_C<L_B$ was satisfied and No. 1-8 where filler metal was used and $L_C<L_B$ was not satisfied, Nos. 1-16 and 1-18 where $L_C<L_B$ was satisfied similarly to the above result had a corrosion depth of 50 μm or less in the corrosion test. Nos. 1-17 and 1-19 not satisfying $L_C<L_B$ had corrosion depth values exceeding the reference value.

As for the second stainless steel member 2 disposed at the inside 22 of the crevice, the crevice corrosion was not observed in the crevice made by welding 3 under the conditions Nos. 1-1 to 1-19 of Table 1.

Example 2

Subsequently, test results when using high-strength stainless steels are described below.

Stainless steels having the constituents shown in Table 2 were each melted in a laboratory vacuum melting furnace, and a laboratory cold-rolled sheet with a thickness of 0.8 mm was produced by rolling and heat treatment. Note that No. 2-9 of Table 2 had a low Cr content, and thus Cr of No. 2-9 was a constituent out of the category as "stainless steel".

TABLE 2

| | | Constituents (mass %) | | | | | | | | | | | |
|---|---|---|---|---|---|---|---|---|---|---|---|---|---|
| No. | Type | C | Si | Mn | P | S | Cr | Ni | Mo | N | V | W | Nb |
| 2-1 | Duplex | 0.016 | 0.44 | 3.5 | 0.023 | 0.001 | 21.6 | 2.2 | 0.24 | 0.188 | 0.11 | 0.02 | 0.04 |
| 2-2 | ↓ | 0.022 | 0.59 | 1.3 | 0.025 | 0.001 | 23.9 | 5.2 | 1.55 | 0.159 | 0.15 | 0.01 | 0.02 |
| 2-3 | ↓ | 0.014 | 0.50 | 1.1 | 0.032 | 0.001 | 25.5 | 6.5 | 2.90 | 0.120 | 0.12 | 0.04 | 0.02 |
| 2-4 | ↓ | 0.020 | 0.61 | 4.6 | 0.029 | 0.001 | 22.1 | 1.4 | 0.31 | 0.220 | 0.10 | 0.01 | 0.02 |
| 2-5 | ↓ | 0.024 | 0.48 | 2.5 | 0.027 | 0.001 | 24.1 | 4.5 | 0.34 | 0.151 | 0.13 | 0.02 | 0.03 |
| 2-6 | ↓ | 0.020 | 0.65 | 3.0 | 0.022 | 0.001 | 22.1 | 2.2 | 0.51 | 0.177 | 0.10 | 0.02 | 0.02 |
| 2-7 | ↓ | 0.014 | 0.60 | 1.5 | 0.024 | 0.001 | 22.2 | 3.0 | 0.75 | 0.181 | 0.10 | 0.01 | 0.02 |
| 2-8 | ↓ | 0.012 | 0.49 | 3.0 | 0.029 | 0.001 | 20.5 | 2.8 | 0.39 | 0.121 | 0.14 | 0.01 | 0.01 |
| 2-9 | ↓ | 0.004 | 0.83 | 2.2 | 0.026 | 0.001 | 17.2 | 0.6 | 0.17 | 0.144 | 0.15 | 0.02 | 0.05 |
| 2-10 | ↓ | 0.031 | 0.41 | 6.9 | 0.029 | 0.001 | 20.3 | 1.5 | 0.44 | 0.009 | 0.14 | 0.01 | 0.02 |
| 2-11 | ↓ | 0.017 | 0.53 | 4.6 | 0.024 | 0.001 | 21.2 | 2.4 | 0.21 | 0.125 | 0.004 | 0.003 | 0.004 |
| 2-12 | ↓ | 0.021 | 0.70 | 5.3 | 0.021 | 0.001 | 26.1 | 3.4 | 0.31 | 0.194 | 0.13 | 0.01 | 0.03 |
| 2-13 | ↓ | 0.016 | 0.44 | 3.5 | 0.023 | 0.001 | 21.6 | 2.2 | 0.24 | 0.188 | 0.11 | 0.02 | 0.04 |
| 2-14 | ↓ | 0.022 | 0.59 | 1.3 | 0.025 | 0.001 | 23.9 | 5.2 | 1.55 | 0.159 | 0.15 | 0.01 | 0.02 |
| 2-15 | ↓ | 0.014 | 0.50 | 1.1 | 0.032 | 0.001 | 25.5 | 6.5 | 2.90 | 0.120 | 0.12 | 0.04 | 0.02 |

TABLE 2-continued

| No. | Constituents (mass %) | | | Left-side value in Formula (1) | Strength TS/ MPa | |
|---|---|---|---|---|---|---|
| | Al | Cu | Others | | | |
| 2-1 | 0.06 | 0.83 | | 0.74 | 731 | Invention |
| 2-2 | 0.03 | 1.51 | B: 0.002%, | 0.60 | 772 | Invention |
| 2-3 | 0.02 | 0.20 | Ca; 0.003%, Mg: 0.001% | 0.73 | 804 | Invention |
| 2-4 | 0.03 | 0.37 | Ta: 0.008% | 0.60 | 762 | Invention |
| 2-5 | 0.04 | 0.55 | REM: 0.007%, Zr: 0.003% | 0.71 | 754 | Invention |
| 2-6 | 0.02 | 0.92 | Sn: 0.002%, Co: 0.02% | 0.64 | 748 | Invention |
| 2-7 | 0.03 | 1.10 | B: 0.004%, Ca: 0.004% | 0.53 | 787 | Invention |
| 2-8 | 0.05 | 0.30 | | 0.45 | 689 | Reference ex. |
| 2-9 | 0.03 | 0.16 | | 0.72 | 724 | Comparative |
| 2-10 | 0.02 | 2.10 | B: 0.002%, Ca: 0.002% | 0.48 | 675 | Reference ex. |
| 2-11 | 0.03 | 1.02 | Sn: 0.003% | 0.26 | 655 | Reference ex. |
| 2-12 | 0.04 | 1.11 | Ti: 0.02%, Hf: 0.003%, Sb0.005% | 0.66 | 815 | Invention |
| 2-13 | 0.06 | 0.83 | | 0.74 | 731 | Invention |
| 2-14 | 0.03 | 1.51 | B: 0.002%, | 0.60 | 772 | Invention |
| 2-15 | 0.02 | 0.20 | Ca; 0.003%, Mg: 0.001% | 0.73 | 804 | Invention |

(1): V + 8W + 5Nb + N + 5C ≥ 0.5

TABLE 3

| No. | Welding | | | | Corrosion test | | |
|---|---|---|---|---|---|---|---|
| | Filler | $L_B$/ mm | $L_C$/ mm | $L_B - L_C$/ mm | Maximum corrosion depth/ μm | Corrosion resistance evaluation | |
| 2-1 | YS2209 | 2.2 | 1.2 | 1.0 | 21 | A | Invention |
| 2-2 | YS2209 | 2.2 | 1.2 | 1.0 | 24 | A | Invention |
| 2-3 | YS2209 | 2.2 | 1.2 | 1.0 | 19 | S | Invention |
| 2-4 | YS2209 | 2.2 | 1.2 | 1.0 | 33 | A | Invention |
| 2-5 | YS2209 | 2.2 | 1.2 | 1.0 | 28 | A | Invention |
| 2-6 | YS2209 | 2.2 | 1.2 | 1.0 | 41 | A | Invention |
| 2-7 | YS2209 | 2.2 | 1.2 | 1.0 | 22 | A | Invention |
| 2-8 | YS2209 | 2.2 | 1.2 | 1.0 | 46 | A | Reference ex. |
| 2-9 | YS2209 | 2.2 | 1.2 | 1.0 | 65 | X | Comparative |
| 2-10 | YS2209 | 2.2 | 1.2 | 1.0 | 45 | A | Reference ex. |
| 2-11 | YS2209 | 2.2 | 1.2 | 1.0 | 42 | A | Reference ex. |
| 2-12 | YS2209 | 2.2 | 1.2 | 1.0 | 18 | S | Invention |
| 2-13 | 309L | 2.2 | 1.2 | 1.0 | 24 | A | Invention |
| 2-14 | 309L | 2.2 | 1.2 | 1.0 | 29 | A | Invention |
| 2-15 | 309L | 2.2 | 1.2 | 1.0 | 20 | A | Invention |

The test piece having a thickness of 0.8 mm was used to prepare a No. 5 test piece prescribed in JIS Z 2241:1998. A tensile test was performed in JIS Z 2241:1998 to determine its tensile strength.

Table 2 shows the constituents, the tensile strength Mpa, and the left-side value in Formula (1) (V+8W+5Nb+N+5C) obtained from the constituents V, W, Nb, N, and C. As shown in Table 2, the tensile strength exceeded 700 MPa in Nos. 2-1 to 2-7, 2-9, and 2-12 to 2-15 where the value obtained from Formula (1) was 0.50 or more, a value of 0.50 being a reference value. On the other hand, in No. 2-8 where the respective constituents satisfied predetermined values but the value obtained from Formula (1) did not satisfy the reference value of 0.50, No. 2-10 where N did not satisfy the predetermined value and the value obtained from Formula (1) did not satisfy the reference value of 0.50, and No. 2-11 (reference example) where V, W, and Nb did not satisfy the predetermined values and the value obtained from Formula (1) did not satisfy the reference value of 0.50, the tensile strength did not satisfy the reference value.

Those materials were welded to prepare a test piece of a crevice made by welding that had the same welding shape as No. 1-4 of Table 1. 309L and YS2209 were used as filler metal similar to Table 1. Then, each test piece was subjected to a corrosion test under the same conditions as above. Table 3 shows results thereof. Since the employed welding shape satisfied $L_C<L_B$, the corrosion depth after the corrosion test was not more than the reference value (50 μm) regardless of the filler metal, provided that the composition of constituents was within the reference range. The results were favorable. On the other hand, in No. 2-9 (comparative example) where Cr contributing largely to the corrosion resistance was lower than the lower limit and the Cr content was out of the category as "stainless steel", the corrosion depth after the corrosion test was greater than 50 μm and the corrosion resistance was inferior.

As described above, the invention can provide a welded structure and a welded container that are excellent in corrosion resistance of a crevice made by welding by adjusting the composition and structure of the crevice made by welding. Further, the invention can provide a high-strength stainless steel for the welded structure and welded container having the ability to withstand higher pressure.

The welded structure and high-pressure container (welded container) of the invention are suitably usable for general containers including a welded portion in which an end plate and a shell plate are welded, such as the above-mentioned can body for storing hot water that is used for a heat pump water heater, tanks for storing water, tanks for storing hot water, and tanks for storing any other liquids. In addition, the welded structure and high-pressure container (welded container) of the invention are suitably usable for application in which a structure of a crevice made by welding requires crevice corrosion resistance, such as a heat exchanger. The high-strength stainless steel for the container having the ability to withstand higher pressure has been exemplified by the duplex stainless steel obtained by adjusting the constituents. However, any other high-strength stainless steel is usable provided that the tensile strength is 700 MPa or more and the shape of the crevice made by welding is regulated.

The invention claimed is:

1. A weld structure comprising: a first stainless steel member and a second stainless steel member, the first stainless steel member and the second stainless steel member defining a crevice made by welding an end of the first stainless steel member and a portion other than an end of the second stainless steel member, wherein a portion close to the end of the first stainless steel member is formed as a weld metal portion by performing welding heat input on the portion close to the end of the first stainless steel member, and a length $L_B$ from a boundary point on a surface forming the crevice, the boundary point being on a boundary between the weld metal portion and a raw material portion, to a crevice deepest portion and a crevice length $L_C$ from the crevice deepest portion to a position having a crevice width of 40 μm satisfy $L_C<L_B$.

2. The weld structure according to claim 1, wherein the weld structure is formed using a low-carbon austenitic stainless steel or a duplex stainless steel as a welding material for welding.

3. The weld structure according to claim 2, wherein one or both of the first stainless steel member and the second stainless steel member comprises: by mass %, 0.001 to 0.050% of C; 0.035% or less of P; 0.01% or less of S; 0.01 to 1.50% of Si; 0.1% or more and less than 8.0% of Mn; 20.0 to 26.0% of Cr; 0.5 to 7.0% of Ni; 0.1 to 4.0% of Mo; 0.10 to 0.25% of N; 0.01 to 0.30% of V; 0.001 to 0.300% of Nb; 0.01 to 1.00% of W; 0.01 to 2.00% of Cu; 0.001 to 0.100% of Al; and a balance consisting of Fe and impurities, and one or both of the first stainless steel member and the second stainless steel member satisfies Formula (1) below and has a tensile strength of 700 MPa or more, $$V+8W+5Nb+N+5C\geq 0.50 \quad (1)$$

where V, W, Nb, N, and C mean contents (mass %) of the respective elements.

4. The weld structure according to claim 3, wherein one or both of the first stainless steel member and the second stainless steel member further comprises, in place of a part of the Fe, one or more of: by mass %, 0.005 to 0.300% of Ti; 0.01 to 1.00% of Co; 0.005 to 0.200% of Ta; 0.001 to 0.050% of Zr; 0.001 to 0.080% of Hf; 0.001 to 0.100% of Sn; 0.001 to 0.100% of Sb; 0.0001 to 0.0050% of B; 0.0005 to 0.0050% of Ca; 0.0001 to 0.0030% of Mg; and 0.005 to 0.100% of REM.

5. A stainless steel welded structure comprising the weld structure according to claim 4.

6. A stainless steel welded container comprising the weld structure according to claim 4, wherein the first stainless steel member is a cylindrical shell plate, and the second stainless steel member is an end plate formed by press forming.

7. A stainless steel welded structure comprising the weld structure according to claim 3.

8. A stainless steel welded container comprising the weld structure according to claim 3, wherein the first stainless steel member is a cylindrical shell plate, and the second stainless steel member is an end plate formed by press forming.

9. A stainless steel welded structure comprising the weld structure according to claim 2.

10. A stainless steel welded container comprising the weld structure according to claim 2, wherein the first stainless steel member is a cylindrical shell plate, and the second stainless steel member is an end plate formed by press forming.

11. The weld structure according to claim 1, wherein one or both of the first stainless steel member and the second stainless steel member comprises: by mass %, 0.001 to 0.050% of C; 0.035% or less of P; 0.01% or less of S; 0.01 to 1.50% of Si; 0.1% or more and less than 8.0% of Mn; 20.0 to 26.0% of Cr; 0.5 to 7.0% of Ni; 0.1 to 4.0% of Mo; 0.10 to 0.25% of N; 0.01 to 0.30% of V; 0.001 to 0.300% of Nb; 0.01 to 1.00% of W; 0.01 to 2.00% of Cu; 0.001 to 0.100% of Al; and a balance consisting of Fe and impurities, and one or both of the first stainless steel member and the second stainless steel member satisfies Formula (1) below and has a tensile strength of 700 MPa or more, $$V+8W+5Nb+N+5C\geq 0.50 \quad (1)$$

where V, W, Nb, N, and C mean contents (mass %) of the respective elements.

12. The weld structure according to claim 11, wherein one or both of the first stainless steel member and the second stainless steel member further comprises, in place of a part of the Fe, one or two or more of: by mass %, 0.005 to 0.300% of Ti; 0.01 to 1.00% of Co; 0.005 to 0.200% of Ta; 0.001 to 0.050% of Zr; 0.001 to 0.080% of Hf; 0.001 to 0.100% of Sn; 0.001 to 0.100% of Sb; 0.0001 to 0.0050% of B; 0.0005 to 0.0050% of Ca; 0.0001 to 0.0030% of Mg; and 0.005 to 0.100% of REM.

13. A stainless steel welded structure comprising the weld structure according to claim 12.

14. A stainless steel welded container comprising the weld structure according to claim 12, wherein the first stainless steel member is a cylindrical shell plate, and the second stainless steel member is an end plate formed by press forming.

15. A stainless steel welded structure comprising the weld structure according to claim 11.

16. A stainless steel welded container comprising the weld structure according to claim 11, wherein the first stainless steel member is a cylindrical shell plate, and the second stainless steel member is an end plate formed by press forming.

17. A stainless steel welded structure comprising the weld structure according to claim 1.

18. A stainless steel welded container comprising the weld structure according to claim 1, wherein the first stainless steel member is a cylindrical shell plate, and the second stainless steel member is an end plate formed by press forming.

19. A stainless steel used in one or both of the first stainless steel member and the second stainless steel member in any one of the weld structure according to claim 1, the stainless steel comprising:

by mass %, 0.001 to 0.050% of C; 0.035% or less of P; 0.01% or less of S; 0.01 to 1.50% of Si; 0.1% or more and less than 8.0% of Mn; 20.0 to 26.0% of Cr; 0.5 to 7.0% of Ni; 0.1 to 4.0% of Mo; 0.10 to 0.25% of N; 0.01 to 0.30% of V; 0.001 to 0.300% of Nb; 0.01 to 1.00% of W; 0.01 to 2.00% of Cu; 0.001 to 0.100% of Al; and a balance consisting of Fe and impurities, the stainless steel satisfying Formula (1) below and having a tensile strength of 700 MPa or more, $$V + 8W + 5Nb + N + 5C \geq 0.50 \quad (1)$$

where V, W, Nb, N, and C mean contents (mass %) of the respective elements.

20. The stainless steel according to claim 19, further comprising, in place of a part of the Fe, one or more of: by mass %, 0.005 to 0.300% of Ti; 0.01 to 1.00% of Co; 0.005 to 0.200% of Ta; 0.001 to 0.050% of Zr; 0.001 to 0.080% of Hf; 0.001 to 0.100% of Sn; 0.001 to 0.100% of Sb; 0.0001 to 0.0050% of B; 0.0005 to 0.0050% of Ca; 0.0001 to 0.0030% of Mg; and 0.005 to 0.100% of REM.

* * * * *